United States Patent [19]

Spina

[11] Patent Number: 4,969,757
[45] Date of Patent: Nov. 13, 1990

[54] MOTOR TORQUE CONTROL

[75] Inventor: Leonard A. Spina, Bernalillo, N. Mex.

[73] Assignee: Honeywell Inc., Minneapolis, Minn.

[21] Appl. No.: 408,583

[22] Filed: Sep. 18, 1989

[51] Int. Cl.$^5$ .............................................. H02P 5/00
[52] U.S. Cl. .................................... 388/815; 388/902; 388/930
[58] Field of Search .............................. 388/800–801, 388/802, 806, 809–815, 902, 930; 318/432, 434, 461, 463, 504

[56] References Cited

U.S. PATENT DOCUMENTS

| | | | |
|---|---|---|---|
| 4,090,119 | 5/1978 | Griffith et al. | 388/806 X |
| 4,099,111 | 7/1978 | Inuba et al. | 388/806 |
| 4,263,988 | 4/1981 | Inuba et al. | 388/806 X |
| 4,415,844 | 11/1983 | Mendenhall et al. | 388/802 X |
| 4,423,362 | 12/1983 | Konrod et al. | 388/810 X |
| 4,427,930 | 1/1984 | Berman et al. | 388/810 |
| 4,565,953 | 1/1986 | Espelage et al. | 388/810 |
| 4,639,652 | 1/1987 | Takahasti et al. | 388/823 |
| 4,675,584 | 6/1987 | Kurosawa | 388/823 |

Primary Examiner—William M. Shoop, Jr.
Assistant Examiner—David Martin
Attorney, Agent, or Firm—Howard Paul Terry

[57] ABSTRACT

A motor torque control assembly is provided which can automatically adjust the motor torque so that its reaction torque remains substantially constant, and so that the reaction torque is not changed by changes in motor internal variables, such as bearing drag, current loop tolerances, motor drag, speed change, and temperature change. Such assembly includes a motor subassembly and a feedback subassembly. The motor subassembly has torque input signal means, a summer unit, a compensator unit, a current loop unit, a motor unit, and a torque output means. The feedback subassembly has torque output sensing means connected to the torque output means for measuring the reaction torque value and connected to the summer unit for measuring the difference of the reaction torque value from a motor torque value of the torque input signal means. A digital feedback subassembly has a divider unit for providing angular acceleration of the motor output and a multiplier unit for providing torque from acceleration and connected to the summer unit. Another embodiment of an analog feedback subassembly has an integrator unit and a low pass filter unit connected to a differentiator unit which connects to the summer unit.

3 Claims, 3 Drawing Sheets

MOTOR TORQUE CONTROL

The invention relates to a motor torque control and in particular the invention relates to a motor torque control having a feedback loop subassembly.

BACKGROUND OF THE INVENTION

The prior art motor torque control does not adjust for motor internal variables, such as bearing drag, current loop tolerances and motor drag. Each motor has a different scale factor, which is a combination of the effects of all such variables at various speeds and temperatures. Software is usually provided in a system to compensate for such effects in the prior art motor.

The problem is that there is no way to automatically adjust the motor torque so that its reaction torque is held constant.

SUMMARY OF THE INVENTION

According to the present invention, a motor torque control assembly is provided. Such assembly includes a motor subasembly having a summer and a compensator and a current loop, and includes a feedback subassembly having an integrator and a filter and a differentiator.

By using the motor torque control assembly, the problem is avoided of having no way to automatically adjust the motor torque so that its reaction torque is held constant.

The foregoing and other objects, features and advantages will be apparent from the following description of the preferred embodiment of the invention as illustrated in the accompanying drawings.

DESCRIPTION OF THE PREFERRED EMBODIMENT

Figures 1, 2:
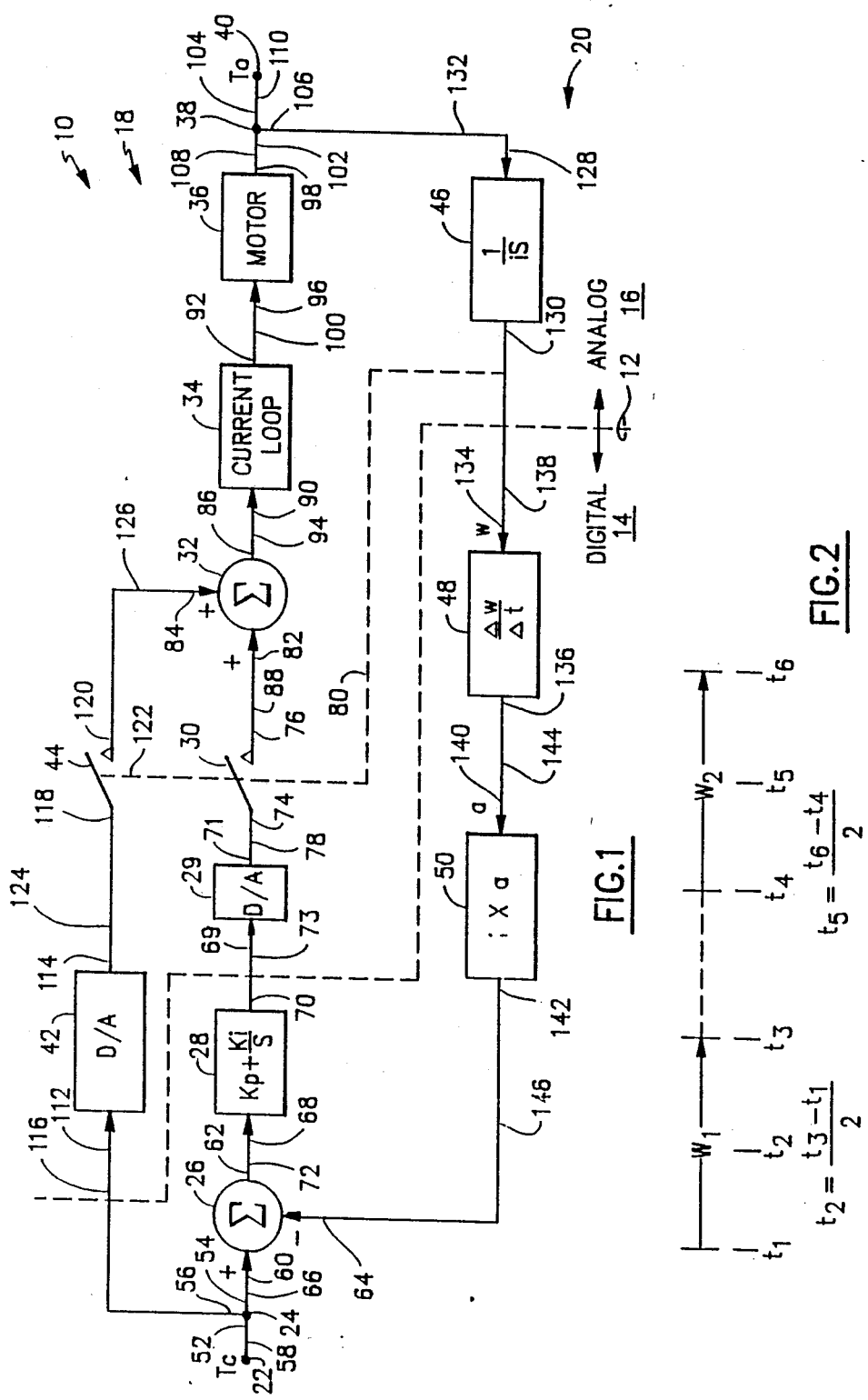
FIG. 1 is a block diagram of a digital motor torque loop assembly according to the invention.
FIG. 2 is a schematic representation of a method used by an assembly processor to calculate motor speed at two different times and the time between these speeds in order to calculate angular acceleration.

As shown in FIG. 1, a digital motor torque loop assembly 10 is provided. Assembly 10, which processes signals, normally functions for wheel speeds greater than 100 revolutions per minute (RPM). For wheel speeds of less than 100 RPM, the loop is opened, as explained hereafter, and the torque command is fed directly to the current loop through a feed forward path.

Assembly 10 is divided by a schematic section line 12 into a digital section 14 and an analog section 16. Assembly 10 includes a motor subassembly 18 and a feedback subassembly 20.

Motor subassembly 18 includes a torque command terminal or means 22, a first junction 24, a first summer 26, a compensator 28 and a digital to analog (D/A) converter 29. Motor subassembly 18 also includes a first switch 30, a second summer 32, a current loop unit 34, a motor 36, a second junction 38, and a torque output terminal or means 40. Motor subassembly 18 also has a digital to analogy (D/A) converter 42 and a second or opposite switch 44.

Feedback subassembly 20 includes a first integrator 46, a divider 48 and a multiplier 50.

Units 22, 24, 26, 28, 48 and 50 are in the digital section 14. The remaining units 29, 30, 32, 34, 36, 38, 40, 42, 44, 46 are in the analog section 16.

First junction 24 has an input terminal 52, a first output terminal 54 and a second output terminal 56. A connector or line 58 connects input terminal 52 to torque command terminal 22. First summer 26 has an input terminal 60, a second input terminal 64, and a first output terminal 62. A connector 66 connects input terminal 60 to junction first output terminal 54. Compensator 28 has an input terminal 68 and an output terminal 70. A connector 72 connects input terminal 68 to summer first output terminal 62. Digital to analog converter 29 has an input terminal 69 and an output terminal 71. A connector 73 connects input terminal 69 to output terminal 70.

First switch 30 has an input terminal 74 and an output terminal 76. A connector 78 connects input terminal 74 to D/A converter output terminal 71. First switch 30 has an actuator 80. Second summer 32 has a first input terminal 82, a second input terminal 84, and an output terminal 86. A connector 88 connects input terminal 82 to switch output terminal 76. Current loop unit 34 has an input terminal 90 and an output terminal 92. A connector 94 connects input terminal 90 to summer output terminal 86.

Motor 36 has an input terminal 96 and an output terminal 98. A connector 100 connects input terminal 96 to current loop output terminal 92. Second function 38 has an input terminal 102, a first output terminal 104 and a second output terminal 106. A connector 108 connects input terminal 102 to motor output terminal 98. A connector 110 connects first output terminal 104 to torque output terminal 40.

Digital to analog converter 42 has an input terminal 112 an output terminal 114. A connector 116 connects input terminal 112 to juction second output terminal 56. Second switch 44 has an input terminal 118 and an output terminal 120 and a second actuator 122. Second actuator 122 connects to first actuator 80; but it acts in a direction opposite to the direction of first actuator 80, so that when the speed (W) is below 100 RPM, switch 30 is open and switch 44 is closed, and so that when the speed (W) is above 100 RPM, switch 44 is open and switch 30 is closed. A connector 124 connects input terminal 118 to D/A output terminal 114. A connector 126 connects output terminal 120 to summer second input terminal 84.

In feedback subassembly 20, integrator 46 has an input terminal 128 and an output terminal 130, a connector 132 connects input terminal 128 to junction second output terminal 106. Divider 48 has an input terminal 134 and an output terminal 136. A connector 138 connects input terminal 134 to output terminal 130. Multiplier 50 has an input terminal 140 and an output terminal 142. A connector 144 connects input terminal 140 to output terminal 136. A connector 146 connects output terminal 142 to summer input terminal 64.

As shown in FIG. 2, a processor can use the method shown to calculate angular acceleration by calculating motor wheel speed at two different times and by calculating the time between these speeds. FIG. 2 shows a graph of time along the x-coordinate and has times $t_1$, $t_2$, and $t_3$ in the graph and shows the formula for calculating time $t_2$. FIG. 2 also shows the times $t_4$, $t_5$ and $t_6$ on the graph and shows the formula for calculating time $t_5$. FIG. 2 also shows the angular motor wheel speed $W_1$ over the time interval from $t_1$ to $t_3$. FIG. 2 also shows the angular motor wheel speed $W_2$ over the time interval from $t_4$ to $t_6$. The angular acceleration is calculated, using wheel speed at two different times, and using the time between these speeds, as explained hereafter.

Figure 3:
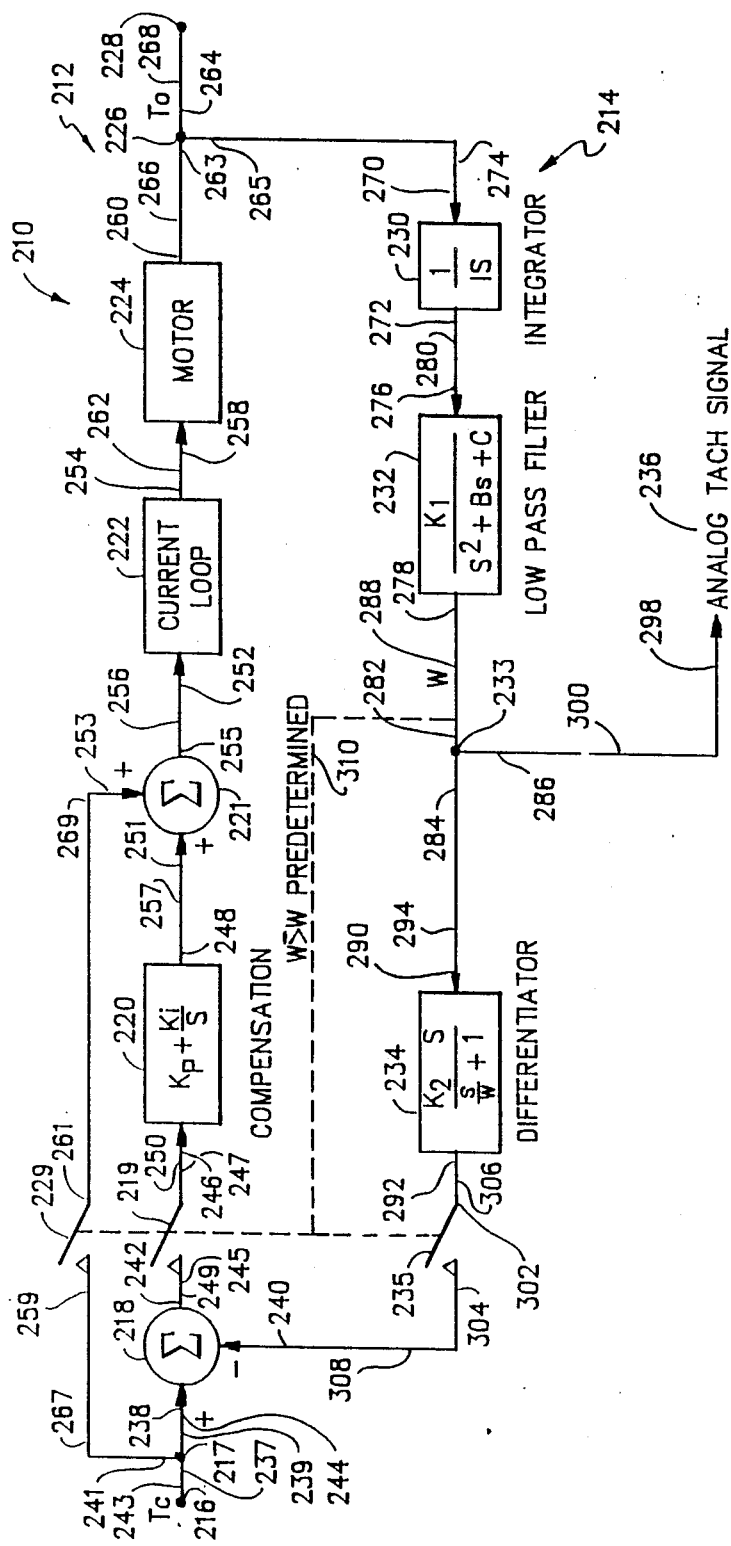
FIG. 3 is a block diagram of an analog motor torque loop assembly according to the invention.

As shown in FIG. 3, an analog torque control assembly 210 is provided. Assembly 210 includes a motor subassembly 212 and a feedback subassembly 214. Motor subassembly 212 has a torque command terminal or means 216, a first junction 217, a first summer 218, a first switch 219, a compensator or amplifier 220, a second summer 221, a current loop unit 222, a motor 224, a second junction 226 and a torque output terminal or means 228. Motor subassembly 212 also has a second or opposite switch 229.

Feedback subassembly 214 has a integrator 230, a low pass filter unit 232, a third junction 233, a differentiating amplifier 234 and a third switch 235 also opposite to switch 229. Feedback subassembly 214 also outputs an analog tachometer signal 236.

First junction 217 has an input terminal 237, a first output terminal 239 and a second output terminal 241. A connector 243 connects input terminal 237 to torque command terminal 216.

Summer 218 has a first input terminal 238, a second input terminal 240, and an output terminal 242. A connector 244 connects first output terminal 239 to first input terminal 238.

First switch 219 has an input terminal 245 and an output terminal 247. A connector 249 connects input terminal 245 to summer output terminal 242.

Compensator 220 has an input terminal 246 and an output terminal 248. A connector 250 connects input terminal 246 to switch output terminal 247.

Second summer 221 has a first input terminal 251, a second input terminal 253 and an output terminal 255. A connector 257 connects first input terminal 251 to compensator output terminal 248.

Current loop unit 222 has an input terminal 252 and an output terminal 254. A connector 256 connects input terminal 252 to summer output terminal 255.

Motor 224, has an input terminal 258 and an output terminal 260. A connector 262 connects input terminal 258 to output terminal 254.

Junction 226 has an input terminal 263 and a first output terminal 264 and a second output terminal 265. A connector 266 connects input terminal 263 to output terminal 260. A connector 268 connects torque output terminal 228 to first output terminal 264.

Switch 229 has an input terminal 259 and an output terminal 261. A connector 267 connects junction output terminal 241 to switch input terminal 259. Another connector 269 connects switch output terminal 261 to summer second input terminal 253.

In feedback subassembly 214, integrator 230 has an input terminal 270 and an output terminal 272. A connector 274 connects input terminal 270 to output terminal 265. Filter unit 232 has an input terminal 276 and an output terminal 278. A connector 280 connects input terminal 276 to output terminal 272.

Junction 233 has a first input terminal 282, a first output terminal 284, and a second output terminal 286. A connector 288 connects input terminal 282 to output terminal 278.

Differentiator 234 has an input terminal 290, and an output terminal 292. A connector 294 connects input terminal 290 to output terminal 284.

Switch 235 has an input terminal 302 and an output terminal 304. A connector 306 connects differentiator output terminal 292 to switch input terminal 302. Another connector 308 connects switch output terminal 304 to first summer input terminal 240. Switches 219, 229, 235 have an actuator 310.

Analog tachometer signal 236 has an input terminal 298. A connector 300 connects input 298 to output terminal 286.

Figures 4, 5:
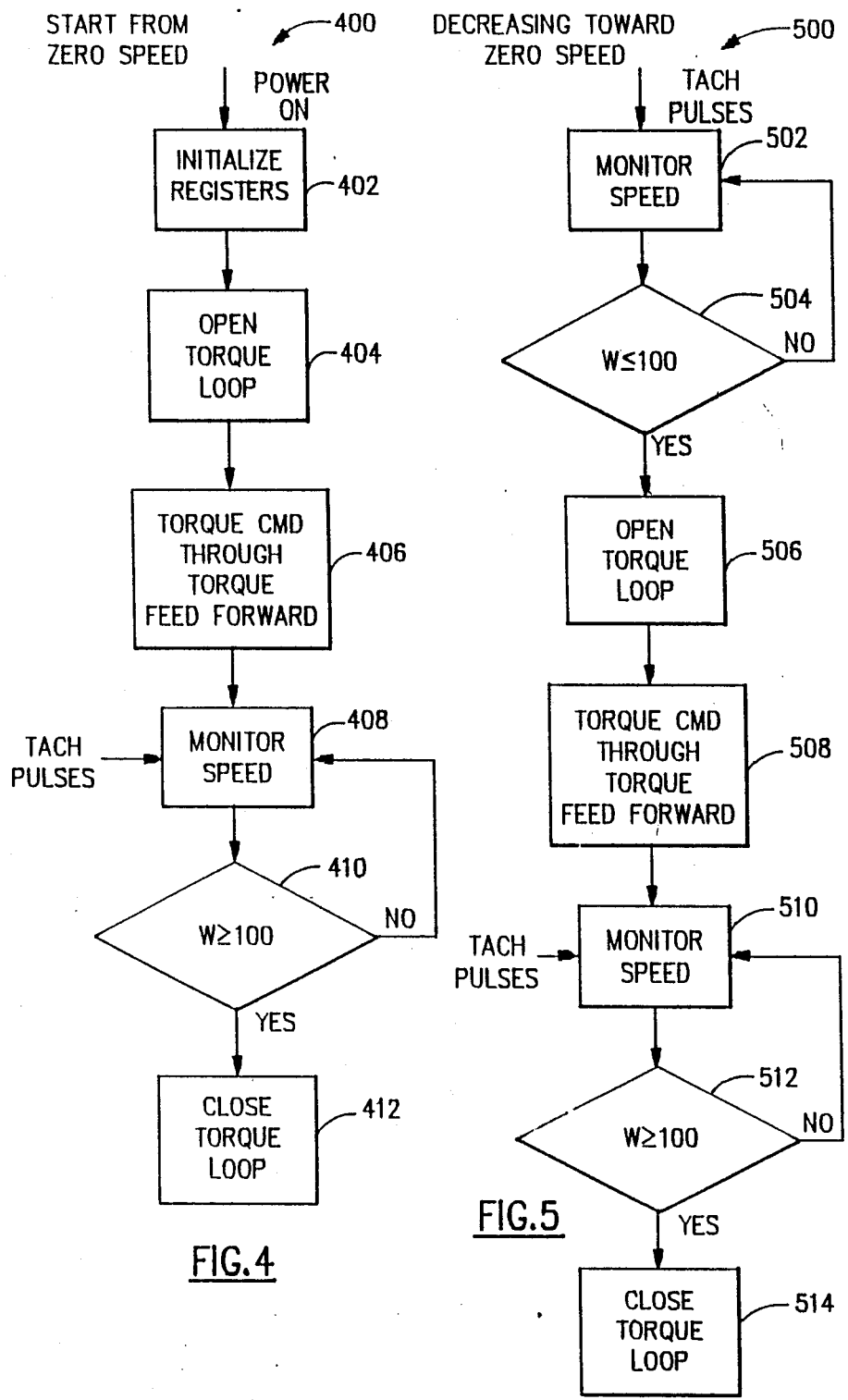
FIG. 4 is a flow chart of an algorithm for passing away from a zero speed.
FIG. 5 is a flow chart of an algorithm for passing toward a zero speed.

As shown in FIGS. 4 and 5, flow charts for the algorithms for the digital assembly 10 of FIG. 1 are provided. In the digital assembly 10 of FIG. 1, excessive errors are avoided by the algorithms in the transitions through zero speed.

As shown in FIG. 4, a flow chart 400 for an algorithm for starting from zero speed is provided. Flow chart 400 starts from zero speed with the power on. Step one or box one 402 is to initialize the registers. Step two 404 is to open the torque loop. Step three 406 is to torque the CMD through the torque feed forward. Step four 408 is to monitor the speed, while receiving a first input of the tachometer pulses, and while receiving a second input that the speed (W) is not more than 100 RPM. Step five 410 is to mesure the speed and give the input to step four 408 that the speed is not more than 100 RPM. Step six 412 is to close the torque loop when it receives a signal from the prior step five 410 that the speed is more than 100 RPM.

As shown in FIG. 5, a flow chart 500 for an algorithm for decreasing toward zero speed is provided. Flow chart 500 starts with an input of the tachometer pulses. Step one or box one 502 is to monitor the speed of the motor wheel. Step two 504 is to measure the speed (W) and to determine if the speed is greater than or less than 100 RPM. Step three 506 is to open the torque loop if speed is less than 100 RPM. Step four 508 is to torque the CMD through the torque feed forward. Step five 510 is to monitor the speed, while receiving a first input of the tachometer pulses and while receiving a second input that the speed is not more than 100 RPM. Step six 512 is to measure the speed and to give the input to step five 510 that the speed is not more than 100 RPM. Step seven 514 is to close the torque loop if it receives a signal from the prior step six 512 that the speed is more than 100 RPM.

The concept of the invention is indicated in the following description and in the following formulas.

Reaction torque is defined by the equation:

$$T = Ia$$

where
T is reaction torque
I is the inertia of the rotating mass
a is the angular acceleration.

The inertia is measured very accurately (0.1%) during assembly of the wheel. All that remains is to obtain the angular acceleration and multiply it by the inertia and this forms the feedback portion of the torque loop and is compared to the commanded input torque (FIG. 1).

The angular acceleration is:

$$a = \frac{\Delta W}{\Delta t} = \frac{\text{Changes in angular velocity}}{\text{Changes in time}}$$

The changes in velocity will be obtained by counting a high resolution pulse train (1000 pulses/rev) generated by an optical reflective sensor looking at alternate reflective and dark areas on the rim of the rotating mass over two periods of time (FIG. 2). The processor will count the number of pulses between $t_1$ and $t_3$ and calculate $W_1$ as follows:

$$W_1 = \frac{N \text{ pulses}/\frac{1000 \text{ pulses}}{\text{rev}}}{(t_3 - t_1) \text{ sec}} \times 2\pi \frac{\text{rad}}{\text{rev}} \text{ in rad/sec}$$

$W_1$ is the average velocity at $t_2$, midway between $t_1$ and $t_3$.

Similarly $$W_2 = \frac{M \text{ pulses}/\frac{1000 \text{ pulses}}{\text{rev}}}{(t_6 - t_4) \text{ sec}} \times 2\pi \frac{\text{rad}}{\text{rev}}$$

$W_2$ is the averge velocity at $t_5$, midway between $t_4$ and $t_6$ in rad/sec.

Angular acceleration is now calculated $$a = \frac{W_2 - W_1}{t_5 - t_2} \text{ in rad/sec}^2$$

It remains only to multiply a by the inertia, I, in oz-in-sec$^2$, to obtain the torque feedback signal in oz-in and compare it to the input torque signal.

In the digital assembly 10 of FIG. 1, the above calculations are extremely simple to perform with a 16 bit processor. To further enhance the performance of the loop, the proportional plus integral compensation (FIG. 1) will all be done in software eliminating the errors associated with the tolerance buildups of the discrete components which would normally perform this function.

In the digital assembly 10 of FIG. 1, at slow wheel speeds, excessive error is inherent in the above calculations, therefore algorithms are required to allow for smooth transitions through zero speed (FIGS. 4, 5).

In the analog assembly 210 of FIG. 3, the motor or momentum wheel runs at some nominal speed and is torqued in either direction around this speed. This lends itself very nicely to a simple discrete analog approach (FIG. 3), since there is no requirement to pass through zero speed. Initially, the input torque command will be fed directly into the current loop as in present designs. At some predetermined speed the compensation and differentiating amplifiers will be switched in to form a closed loop system. The output of the low pass filter is a voltage proportional to speed. The differentiator gives a voltage proportional to the rate of change of the low pass filter voltage which is angular acceleration. From before;

$$a = \frac{\Delta W}{\Delta t} = \frac{\text{Changes in angular velocity}}{\text{Changes in time}}$$

In the analog assembly 210 of FIG. 3, the multiplication of the angular acceleration by the inertia is taken into account in the constants $K_1$ and $K_2$.

In the analog assembly 210 of FIG. 3, the compensation and differentiating blocks can be implemented by a single amplifier or op amp each. The analog approach does not have the dynamic range or the accuracy of the digital loop and therefore has a more limited application.

The advantages of assembly 10, and assembly 210, are indicated hereafter.

A. By using the assembly 10 or 210, the problem is avoided of having no way to automatically adjust the motor torque so that its reaction torque is held constant.

B. The need for spacecraft system software to correct for motor internal variables is avoided.

C. The need for a motor, which adjusts for its own torque variables, and which is suitable for an attitude control system in a space environment, is satisfied.

While the invention has been described in its preferred embodiments, it is to be understood that the words which have been used are words of description rather than limitation and that changes may be made within the purview of the appended claims without departing from the true scope and spirit of the invention in its broader aspects.

The embodiments of an invention, in which an exclusive property or right is claimed are defined as follows:

1. A motor torque control assembly including a motor subassembly and a feedback subassembly wherein
   said motor subassembly comprises:
   a digital torque command means having an output terminal;
   a digital first junction means having an input terminal connected to the digital torque command means output terminal and having a first output terminal and having a second output terminal;
   a digital first summer means having an input terminal connected to the digital first junction means first output terminal and having a second input terminal and having an output terminal;
   a digital compensator means having an input terminal connected to digital first summer means output terminal and having an output terminal;
   a digital to analog converter means having an input terminal connected to the digital compensator means output terminal and having an output terminal;
   an analog first switch means having an input terminal connected to the digital to analog converter means output terminal and having an output terminal;
   an analog second summer means having an input terminal connected to the analog first switch means output terminal and having a first output terminal and having a second input terminal;
   an analog current loop means having an input terminal connected to the analog second summer means output terminal and having an output terminal;
   an analog motor means having an input terminal connected to the analog current loop means output terminal and having an output terminal;
   an analog second junction means having an input terminal connected to the analog motor means output terminal and having a first output terminal and having a second output terminal; and
   an analog torque output means having an input terminal connected to the analog second junction means first output terminal, and wherein
   said feedback subassembly includes an input terminal connected to the analog second junction means second output terminal and has an output terminal connected to the digital first summer means second input terminal; and wherein said motor subassembly also comprises:

a digital to analog converter means having an input terminal connected to the digital first junction means second output terminal and having an output terminal; and an analog second switch means having an input terminal connected to the digital to analog converter means output terminal and having an output terminal connected to the analog second summer means second input terminal, and wherein said feedback subassembly comprises:

an analog integrator means having an input terminal connected to the analog second junction means second output terminal and having an output terminal;

a digital divider means having an input terminal connected to the analog integrator means output terminal and having an output terminal; and a multiplier means having an input terminal connected to the digital divider means output terminal and having an output terminal connected to the digital first summer means second input terminal.

2. A motor torque control assembly including an analog motor subassembly and an analog feedback subassembly, wherein said analog motor subassembly comprises;

a torque command means having an output terminal;

a first junction means having an input terminal connected to the torque command means output terminal and having a first output terminal and having a second output terminal;

a first summer means having an input terminal connected to the first junction means first output terminal and having a second input terminal and having an output terminal;

a first switch means having an input terminal connected to the first summer means output terminal and having an output terminal;

a compensation means having an input terminal connected to the first switch means output terminal and having an output terminal;

a second summer means having an input terminal connected to the compensation means output terminal and having a second input terminal and having an output terminal;

a current loop means having an input terminal connected to the second summer means output terminal and having an output terminal;

a motor means having an input terminal connected to the current loop means output terminal and having an output terminal;

a second junction means having an input terminal connected to the motor means output terminal and having a first output terminal and having a second output terminal; and torque output means having an input terminal connected to the second junction means first output terminal, and wherein said analog feedback subassembly has an input terminal connected to the second junction means second output terminal and has an output terminal connected to the first summer means second input terminal, and wherein said analog feedback subassembly comprises:

an integrator means having an input terminal connected to the junction means second output terminal and having an output terminal;

a low pass filter means having an input terminal connected to the integrator means output terminal and having an output terminal;

a third junction means having an input terminal connected to the low pass filter means output terminal and having a first output terminal which is an analog tachometer and having a second output terminal;

a differentiator means having an input terminal connected to the second junction means second output terminal and having an output terminal; and a second switch means having an input terminal connected to the differentiator means output terminal and having an output terminal connected to the first summer means second input terminal; and wherein said analog motor subassembly has a third switch means having an input terminal connected to the first junction means second output terminal and having an output terminal connected to the second summer means second input terminal.

3. A motor torque control assembly including a motor subassembly and a feedback subassembly, wherein said motor subassembly comprises:

a digital torque command means;

a digital first junction means connected to the digital torque command means;

a digital first summer means connected to the first junction means;

a digital compensator means connected to the digital first summer means;

a digital to analog converter means connected to the digital compensator means;

an analog first switch means connected to the digital to analog converter means;

an analog second summer means connected to the analog first switch means;

an analog current loop means connected to the analog second summer means;

an analog motor means connected to the analog current loop means;

an analog second junction means connected to the analog motor means;

an analog torque output means connected to the analog second junction means;

a digital to analog converter means connected to the digital first junction means; and an analog second switch means connected to the digital to analog converter means and also connected to the analog second summer means, and wherein said feedback subassembly is connected to the analog second junction means and is connected to the digital first summer means, and wherein said feedback subassembly comprises;

an analog integrator means connected to the analog second junction means;

a digital divider means connected to the analog integrator means; and a multiplier means connected to the digital divider means and connected to the digital first summer means.

* * * * *